US006788338B1

United States Patent
Dinev et al.

(10) Patent No.: US 6,788,338 B1
(45) Date of Patent: Sep. 7, 2004

(54) HIGH RESOLUTION VIDEO CAMERA APPARATUS HAVING TWO IMAGE SENSORS AND SIGNAL PROCESSING

(76) Inventors: Petko Dimitrov Dinev, 1398 NW. 14 St., Boca Raton, FL (US) 33486; Peter Magni Englesson, Royal Colonial Apt. 1015 Spanish River Rd., Boca Raton, FL (US) 33432

( * ) Notice: Subject to any disclaimer, the term of this patent is extended or adjusted under 35 U.S.C. 154(b) by 792 days.

(21) Appl. No.: 09/716,891

(22) Filed: Nov. 20, 2000

(51) Int. Cl.[7] .......................... H04N 5/228; H04N 9/68
(52) U.S. Cl. .................... 348/222.1; 348/234
(58) Field of Search ....................... 348/222.1, 216.1, 348/234–238, 342, 344, 450, 253, 256, 272, 266, 262, 207.99

(56) References Cited

U.S. PATENT DOCUMENTS

| | | | | |
|---|---|---|---|---|
| 4,652,909 A | * | 3/1987 | Glenn | 348/262 |
| 4,667,226 A | * | 5/1987 | Glenn | 348/344 |
| 4,823,186 A | | 4/1989 | Muramatsu | |
| 4,876,591 A | | 10/1989 | Muramatsu | |
| 5,523,785 A | * | 6/1996 | Muramoto | 348/254 |
| 5,978,023 A | | 11/1999 | Glenn | |
| 6,266,093 B1 | * | 7/2001 | Glenn | 348/448 |

OTHER PUBLICATIONS

William Glenn & John Marcinka, 'The Development of a 1920×1080 Pixel Color CCD Camera Progressively Scanned at 60 frames per Second', presented at SMPTE, Nov. 1997, New York.

* cited by examiner

Primary Examiner—Aung Moe

(57) ABSTRACT

A video signal generating apparatus where the video signal is produced using two different image sensors has been described. The optical beam received from the camera lens is split into two beams via a beam splitter. Each beam is applied to the corresponding color and monochrome image sensors. Both imagers are scanned synchronously, and the corresponding output signals are digitized. The monochrome imager is scanned at a lower frame rate and generates a high-resolution luminance signal $Y_H$. The second imager has color filters, arranged as vertical stripes. This imager is scanned at a higher frame rate, faster than the first frame rate, and generates a set of two low-resolution color difference signals $C_R$ and $C_B$, and one low-resolution luminance signals $Y_L$. At frame 1 both image sensors are scanned, at frames 2 and 3 only the color sensor is scanned, at frame 4 both image sensors are scanned, at frames 5 and 6 only the color sensor is scanned, at frame 7 both image sensors are scanned, and so on. The low-resolution color signals $C_R$ and $C_B$ from frames 1,4,7 etc. are digitally interpolated to have the same resolution as corresponding high-resolution luminance signal $Y_H$. Parallel with this, a set of motion signals are generated from the low-resolution luminance $Y_L$ from all frames The motion signals, the interpolated color difference signals, and the high-resolution luminance $Y_H$ are mixed into a composite data stream, compressed if necessary, and formatted into a standard 20 bits wide 1.5 Giga bits per second data rate. Additional information such as date, time, camera location, etc. can be added to the data stream if needed.

18 Claims, 1 Drawing Sheet

HIGH RESOLUTION VIDEO CAMERA APPARATUS HAVING TWO IMAGE SENSORS AND SIGNAL PROCESSING

BACKGROUND OF THE INVENTION

1. Background—Field of the Invention

This invention relates to a novel high-resolution color video camera having high-resolution color image capture and, more particularly, a high-resolution color video camera having two different image sensors and a signal processing apparatus for generating a high-resolution color image.

2. Background—Description of the Prior Art

Color video cameras are well known and used for many years in television production, news gathering and cinematography. Recent improvement in the sensors manufacturing process made possible the development of high-resolution color sensors with several million active pixels, and thus the development of high-resolution (high definition) video cameras, which are to replace the conventional standard definition television cameras and to enable the use of these new cameras in the motion picture industry. Parallel with that, new high definition video standards have been developed to facilitate this process.

Several types of solid-state video cameras utilizing a plurality of image sensors are already known. Prior art cameras, such as described in the U.S. Pat. Nos. 4,823,186 and 4,876,591 to Muramatsu, use a beam splitter and two image sensors—one monochrome and one color. The obtained video signal is a combination of two luminance signals, $Y_L$ and $Y_H$, and two low frequency color difference signals, $R_L$-$Y_L$ and $B_L$-$Y_L$. The monochrome imager generates only the high-resolution portion $Y_H$ of the luminance signal Y. The color imager generates the low-resolution portion $Y_L$ of the luminance signal and the two color difference signals $R_L$-$Y_L$ and $B_L$-$Y_L$. The camera device is intended for an interlaced NTSC application, in which a video frame is captured every 1/30 of a second (1/60 of a second for odd fields and 1/60 of a second for even fields). In this mode of interlaced scanning an artifact, known as interline flicker, is present. This artifact is due to "Moire patterns"—high-resolution information near the Nyquist limit of resolution that produces a beat at low spatial frequencies resulting in flicker at 30 Hz (for NTSC standard signals). To avoid 'Moire pattern', Muramatsu advised us that the bandwidth for $Y_L$, $R_L$-$Y_L$ and $B_L$-$Y_L$ signals should be from 0 to 0.7 MHz, and the bandwidth for $Y_H$ should be from 0.7 to 4.2 MHz. Unfortunately, these bandwidth restrictions limit the application of the camera device to the conventional NTSC standard. Being limited to NTSC standard, which is interlaced in its nature and has a bandwidth limit of 4.2 MHz, the method is not applicable to high-resolution machine vision and computer cameras, which predominantly use progressive scanning to eliminate 'Moire pattern'. Furthermore, this camera is not compatible with newly developed digital and high definition television (HDTV) standards, which also use progressive scanning with 480 lines per frame, 720 lines per frame, and 1080 lines per frame. In addition, high definition luminance Y and the corresponding color difference signals $C_R$ and $C_B$ have bandwidth much higher than NTSC. For example, for 720 lines per frame, the luminance bandwidth is about 30 MHz, and $C_R$ and $C_B$ bandwidth is 15 MHz each. Moreover, the low frequency luminance signal $Y_L$ is derived from the color imager, so an imager with tri-color filters (red, green, blue or yellow, cyan, magenta) is required. Thus, the implementation of an imager with only two types of color filters (such as red and blue) is not possible.

In U.S. Pat. No. 5,978,023 to Glenn, and in the article 'The Development of a 1920×1080 Pixel Color CCD Camera Progressively Scanned at 60 Frames per Second', by Glenn and Marcenka, a video camera is described, where together with line and pixel interpolation the camera uses high-pass filtering and frame interpolation on the luminance channel for increasing the frame rate. As a result a high-resolution 1920×1080 image scanned at 60 frames per second is generated. The output data rate of this image is about 3.3 Giga bits per second, which is beyond the capacity of the current analog or digital data recorders, editing and transmitting systems. In the majority of applications this increasing of the frame rate is not justified, does not improve the picture quality, and unnecessarily overloads and increases the computational time. In addition, particularly for digital cinema applications image scanning is only at 24 frames per second. In some special effects fast motion capture is necessary, but 60 frames per second is not fast enough and further complicates the recording, because the existing video recorders can record either normal speed at 24 frames per second or fast capture at three times the speed, i.e. 72 frames per second. In addition, this fast capture mode is used for selected frames only, and not for the entire production.

Accordingly, it is a general object of this invention to provide a novel apparatus for high-resolution and high frame rate image capture that can operate at the newly developed high definition television and digital cinema standards. It is a further object of the present invention to provide an improved progressively scanned high-resolution color camera apparatus, which is compatible with the existing data recording and editing equipment. It is also a further object of tile present invention to provide an improved progressively scanned high-resolution color camera apparatus and method for machine vision and computer applications.

These and other objects, advantages and features of the present invention will become more obvious from the following detailed description of the preferred embodiments along with the accompanying drawings.

SUMMARY OF THE INVENTION

Accordingly, the present invention provides a novel high-resolution video camera able to capture high-resolution images with high frame rate, where the video signal is produced using one monochrome and one color image sensors, and a signal processing apparatus. This novel apparatus does not involve frame rate temporal interpolation and high-pass filtering in its work.

According to one preferred embodiment of the present invention, the high-resolution camera includes a camera lens, a beam splitter, and two image sensors—one color and one monochrome, optically aligned with the lens and the beam splitter. The optical beam received from the camera lens is equally split into two beams via a 50/50 beam splitter and each beam projects an image onto the corresponding image sensor. The beam splitter can have unequal dividing ratio, such as 60/40, 30/70 or others. Both image sensors have the same active area and the same number of pixels horizontally and vertically. If sensors with different active areas are used, an additional lens or set of lenses is used to alter one or both optical beams divergence angle, modifying the optical beam cross-section in such a way that the new image size corresponds to the image sensor's active area. Thus, regardless of their size, both sensors will capture exactly the same scene.

In this embodiment both image sensors are scanned synchronously using a progressive scanning mode. In this particular application the monochrome imager has 1920 ($M_H$=1920) horizontal pixels per line and 1080 ($M_V$=1080) vertical lines. This imager is scanned at 24 frames per second. The output signal is digitized with 12-bit A/D and results in a high-resolution luminance signal $Y_H$. The resolution of this signal is 1920 ($Y_{HH}$=1920) horizontal pixels per line and 1080 ($Y_{HV}$=1080) vertical lines. An additional 12-to-10 bit gamma correction can be used.

The color imager has red, green and blue color filters arranged as RGBG vertical stripes, i.e. the first stripe has red color, the second—green, the third—blue, the fourth—green, the fifth is again red, an so on. This imager is scanned at 72 frames per second adding three lines at a time (3:1 binning), and generates three low-resolution color signals red, green and blue. The spatial resolution of the red and blue signals is 480 horizontal pixels per line and 360 vertical lines, and the spatial resolution of the green signal is 960 horizontal pixels per line and 360 vertical lines. These signals are digitized using a triple 12-bit A/D converter, and then converted to two low-resolution color difference signals, $C_R$ and $C_B$, and one low-resolution luminance signal $Y_L$. The spatial resolution of each color difference signal $C_R$ or $C_B$ in this particular application is 480 ($C_H$=480) horizontal pixels per line and 360 ($C_V$=360) vertical lines. The spatial resolution of the low-resolution luminance signal $Y_L$ is 960 ($Y_{LH}$=960) horizontal pixels per line and 360 ($Y_{LV}$=360) vertical lines. An additional 12-to-10 bit gamma correction can be used on each signal.

Both image sensors are scanned synchronously as described below. At frame 1 both image sensors are scanned, at frames 2 and 3 only the color sensor is scanned, at frame 4 both image sensors are scanned, at frames 5 and 6 only the color sensor is scanned, at frame 7 both image sensors are scanned, and so on. In this embodiment $Y_{H1}$, $Y_{H4}$, $Y_{H7}$ and so on, represent the high-resolution luminance from frames 1,4,7 and so on, and $C_{R1}$, $C_{B1}$, $Y_{L1}$, $C_{R2}$, $C_{B2}$, $Y_{L2}$, $C_{R3}$, $C_{B3}$, $Y_{L3}$, and so on, represent the low-resolution luminance and color differences from frames 1,2,3 and so on. Thus a synchronous scanning at 24 frames per second for the monochrome imager and 72 frames per second for the color imager is achieved. In this mode of scanning each frame from the monochrome imager has a corresponding color frame.

The signals $C_R$, $C_B$ and $Y_L$ are supplied to a signal processing module. First, the signals $C_{R1}$ and $C_{B1}$ are digitally interpolated 1:4 in horizontal direction and 1:3 in vertical direction to $C_{HR1}$ and $C_{HB1}$, which have the same pixel resolution as the corresponding high-resolution luminance signals $Y_{H1}$. $C_{HR1}$, $C_{HB1}$ and $Y_{H1}$ are temporally aligned using an appropriate delay line and digitally mixed together. The same procedure is repeated for the frames 4, 7, etc. In this way a high-resolution image scanned at 24 frames per second is generated. On the next step the low-resolution luminance signals $Y_{L1}$, $Y_{L2}$ and $Y_{L3}$, are selected, and two new motion vector signals $M_{Y2}$ and $M_{Y3}$ are generated using frame subtraction. $M_{Y2}$ is generated when $Y_{L1}$ is subtracted pixel by pixel from $Y_{L2}$, and $M_{Y3}$ is generated when $Y_{L1}$ is subtracted pixel by pixel from $Y_{L3}$. The same procedure is repeated for frames 4, 5, 6, for frames 7, 8, 9, and so on. The existing editing equipment can use this motion information to generate special motion effects, which will be added to the existing high-resolution image. For more precise motion an additional set of motion signals $M_{R2}$, $M_{R3}$ and $M_{B2}$, $M_{B3}$ can be derived in the same way from $C_{R1}$, $C_{R2}$, $C_{R3}$ and $C_{B1}$, $C_{B2}$, $C_{B3}$.

The newly generated motion signals $M_{Y2}$, $M_{Y3}$, $M_{R2}$, $M_{R3}$, $M_{B2}$, and $M_{B3}$ are mixed together with the newly generated high-resolution image forming in this way a composite data stream containing all image and motion information. Additional information such as date, time, camera location, etc. can be added to the data stream if needed. This composite data stream is further compressed if required to a 1.5 Giga bits per second data rate, and thus it can be recorded on the existing data recorders.

In some specific applications high frame rate information is not required, so both imagers can be scanned with the same frame rate.

BRIEF DESCRIPTION OF THE DRAWINGS

The invention may take form in various parts and arrangements of parts or in various steps and arrangements. The drawings are only for purposes of illustrating a preferred embodiment and are not to be construed as limiting the invention.

DESCRIPTION OF THE PREFERRED EMBODIMENT

Figure 1:
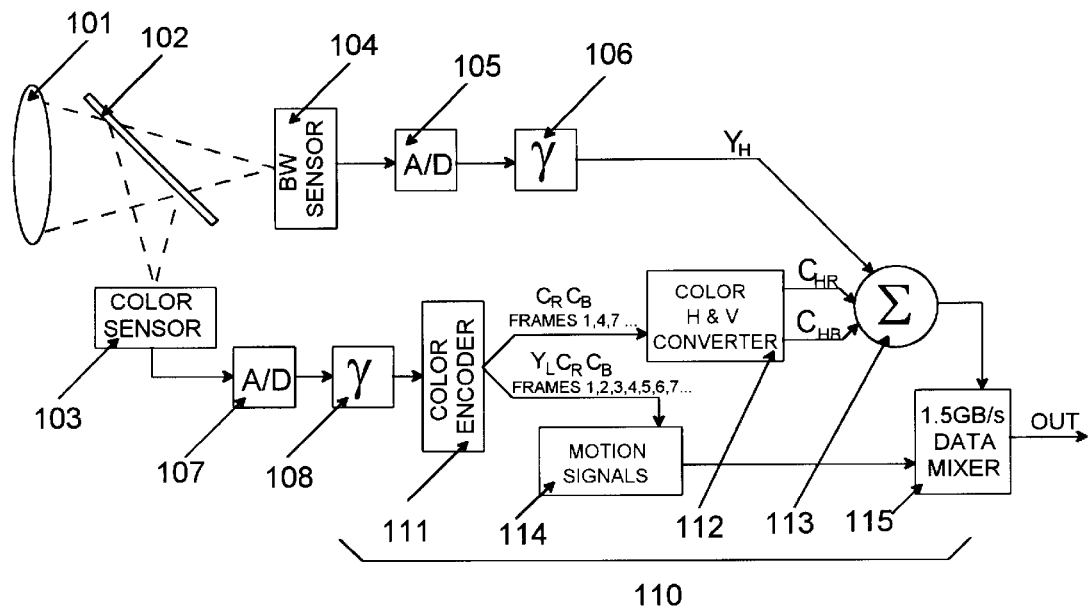
FIG. 1 shows a block diagram of one form of the high-resolution color video camera.

FIG. 1 shows a block diagram of one form of the high-resolution color video camera designed for high-resolution image capture. With reference to FIG. 1, a camera lens 101 is optically aligned with a beam splitter 102, a color image sensor 103, and a monochrome image sensor 104. The beam splitter 102 can be a half-silvered mirror, pellicle or similar device. In one preferred embodiment both image sensors 103 and 104 have the same active area, the same number of pixels per line—1920, and the same number of vertical lines—1080. The color image sensor 103 has a set of red (R), green (G) and blue (B) color filters placed on its surface, arranged as R G B G vertical stripes. Many other color combinations such as magenta, yellow, green and cyan; yellow and cyan; red and blue can be used. Both image sensors 103 and 104 are scanned synchronously using progressive scanning, where image sensor 104 is scanned at a relatively slow scan rate, and the image sensor 103 is scanned at a relatively fast frame rate.

The sensor 104 has output representative of the luminance level of a scene being imaged and can be any monochrome CCD or CMOS imager or other imaging device. The output of imager 104, which in this application is analog, is connected to the input of a first analog to digital converter 105, the output of which is connected to a first gamma corrector 106, which outputs a high-resolution luminance $Y_H$. If imager 104 generates a direct digital output, no analog-to-digital converter 105 is necessary. The sensor 103 has an output representative of the color pattern of the imaged scene, and can be any color CCD or CMOS imager or other imaging device. The output of 103, which in this application is analog, is connected to the input of a second analog to digital converter 107, the output of which is connected to a second gamma corrector 108. If imager 103 generates digital output, no analog-to-digital conversion is necessary.

The output of the gamma corrector 108 is connected to a signal processing apparatus 110, which first processing module comprises a color difference encoder 111. The encoder 111 has three outputs, which in the present embodiment are one low-resolution luminance signal $Y_L$ and two color difference component signals $C_R$ and $C_B$. The output signals $Y_L$, $C_R$ and $C_B$ are coupled to a motion prediction module 114. In addition, the signals $C_R$ and $C_B$ are coupled to a dual pixel and line rate converter 112. The output signals $C_{HR}$ and $C_{HB}$ from the converter 112, along with the output $Y_H$ from the gamma corrector 106, are connected to the corresponding inputs of an adder 113. The corresponding output signals from 113 and 114 are connected to a data mixer 115.

Light received from the scene being imaged is focused by the camera lens 101, through the beam splitter 102 onto the front surfaces of the imager 104. Part of the light is reflected from the beam splitter 102 toward color imager 103, which receives a left-right reversed image. The beam splitter may distribute the light equally or unequally between said image sensors, where more light could be distributed towards the color imager 103. Both imagers 103 and 104 are optically aligned, so they receive exactly the same part of the scene, i.e. the top right pixel of imager 103 is optically aligned with the top left pixel of imager 104 and so forth (accounted for left-right image reversal). The image sensor 104 is scanned at a relatively slow scan rate, which in this embodiment is 24 frames per second, to produce 1080 visible lines per frame. The image sensor 103 is scanned faster than sensor 103, which in this embodiment is 72 frames per second by adding three lines at a time, to produce 360 visible lines per frame. At frame 1 both image sensors are scanned, at frames 2 and 3 only the color sensor 103 is scanned, at frame 4 both image sensors are scanned, at frames 5 and 6 only the color sensor 103 is scanned, at frame 7 both image sensors are scanned, and so on. 24 frames per second progressive scanning for imager 104, and 72 frames per second progressive scanning for imager 103 should not be considered as a limitation. Other frame rates, as well as interlaced scanning can be used.

The imager 104 creates a high frequency luminance signal, which carries complete information about the scene gray level pattern. Converter 105 digitizes the output signal from imager 104, and the digital data stream is gamma corrected using gamma corrector 106. In this embodiment the converter 105 is a 12-bit A/D converter, the corrector 106 compresses the data to 10 bits, and the high-luminance $Y_H$ has a resolution of $M_V$=1080 vertical lines and $M_H$=1920 horizontal pixels per line.

The color imager 103 creates a set of three signals, providing complete information about the scene color pattern. The format of said color signals depends on the actual imager, and in this particular application the signals are carrying information about green, red and blue contents of the scene. Since the imager 103 receives a mirror image of the scene (left-right reversal), the imager 103 is scanned in reversed horizontal order from right to left, i.e. for each horizontal line the last pixel is clocked out first, and the first pixel is clocked last. This line reversal is not to be limited only to a hardware implementation, in some embodiments this can be done in software. Converter 107 digitizes the output signal from imager 103, and the digital data stream is further gamma corrected using gamma corrector 108. In this embodiment the converter 107 is a 12-bit A/D converter, and the corrector 108 compresses the data to 10 bits. The gamma-corrected data stream from 108 is converted in encoder 111 to a set of one low-resolution luminance signal $Y_L$ and two color difference component signals $C_R$ and $C_B$. The spatial resolution of the luminance signal $Y_L$ in present embodiment corresponds to 360 vertical lines and 960 horizontal pixels per line, and the resolution of each color difference signal $C_R$ or $C_B$ is 480 horizontal pixels per line, and 360 vertical lines.

The converter 112 processes only the color difference signals $C_R$ and $C_B$ from frames 1, 4, 7 and so on, i.e. only the color frames that have a matching mono frame. Pixel and line interpolation is a well-known prior art. In the present embodiment the converter 112 interpolates the pixels in horizontal direction and the lines in vertical direction. During the first step, converter 112 creates one additional pixel between every two existing adjacent pixels, based on the average signal level of said adjacent pixels, and thus doubling the number of pixels in horizontal direction. This process is repeated one more time where, based on the same averaging scheme, one additional pixel is created in horizontal direction between every two already interpolated pixels. This results in quadrupling the number of horizontal pixels. During the second step two additional lines are created between every two existing adjacent lines in vertical direction, based on the average signal level of said adjacent lines. In this way every high-resolution luminance pixel from the mono imager 104 will have two corresponding color difference pixels from imager 103. The interpolated color signals $C_{HR}$ and $C_{HB}$ and the luminance signal $Y_H$ are temporally aligned using, if necessary, an appropriate delay line, and then digitally mixed together in adder 113. The latter outputs a serial data stream representing the high-resolution image scanned at the slower rate, which in this embodiment is 24 frames per second. The overall image resolution will be determined by the resolution of the luminance signal $Y_H$ produced by the monochrome imager 104.

Parallel with the interpolation process, the output signals $Y_L$, $C_R$ and $C_B$ from each frame are processed in the motion predictor 114. Module 114 derives two motion signals $M_{Y2}$ and $M_{Y3}$, each generated when the luminance from frames 2 and 3 is subtracted pixel by pixel from frame 1. If luminance signals from frames 1, 2 and 3 are noted as $Y_{L1}$, $Y_{L2}$ and $Y_{L3}$, so $M_{Y2}=Y_{L2}-Y_{L1}$, and $MY_3=Y_{L3}-Y_{L1}$. The same procedure is repeated for $C_R$ and $C_B$, and results in four motion signals $M_{R2}$, $M_{R3}$ and $M_{B2}$, $M_{B3}$. The newly developed motion signals along with the high-resolution images produced from 113 are mixed in mixer 115 into a composite data stream, compressed if necessary, and formatted into a standard 20 bits wide 1.5 Giga bits per second data rate. Additional information such as date, time, camera location, etc. can be added to the data stream if needed. This composite data stream is now compatible with the existing data recording and editing equipment, and in the same time contains complete image resolution and motion information.

Figure 2:
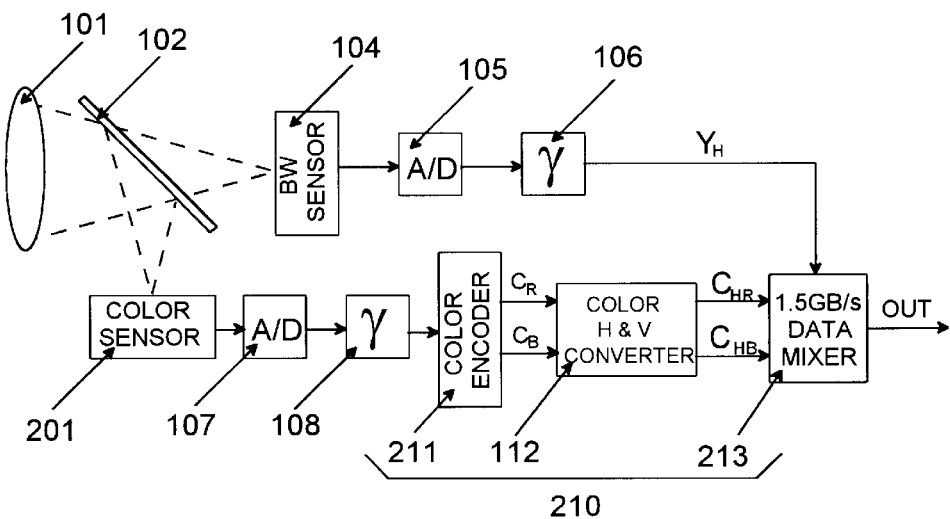
FIG. 2 shows an alternative embodiment of the high-resolution color video camera of FIG. 1.

FIG. 2 shows an alternative embodiment, which is modified from and basically similar in structure to the embodiment shown in FIG. 1. In FIG. 2, like parts, which correspond to those in FIG. 1, are marked with the same reference numerals. In this modified design the camera lens 101 is optically aligned with the beam splitter 102, monochrome image sensor 104, and a color image sensor 201. In this embodiment both image sensors 201 and 104 have the same active area, the same number of pixels per line—1920, and the same number of vertical lines—1080. The color image sensor 201 has a set of red (R), green (G) and blue (B) color filters placed on its surface, arranged in R G B G square, known as "BAYER" pattern. Many other color combinations such as magenta, yellow, green and cyan; yellow and cyan; red and blue can be used. In addition, the color image sensor 201 may be a combination of a monochrome image sensor 104 and a revolving color wheel, the latter comprising a set of color filters described above, wherein the rotation of said color wheel is synchronized with the scanning mode.

Both image sensors 201 and 104 are scanned synchronously using progressive scanning at the same frame rate. The output of imager 104, which in this application is analog, is connected to the input of the first analog to digital converter 105, the output of which is connected to the first gamma corrector 106, which outputs a high-resolution luminance $Y_H$. If imager 104 generates a direct digital output, no analog-to-digital converter 105 is necessary. The sensor 201 has an output representative of the color pattern of the imaged scene, and can be any color CCD or CMOS imager or other imaging device. The output of 201, which in this application is analog, is connected to the input of a second analog to digital converter 107, the output of which is connected to a second gamma corrector 108. If imager 201 generates digital output, no analog-to-digital conversion is necessary.

The output of the gamma corrector 108 is connected to a signal processing apparatus 210, which first processing module comprises a color difference encoder 211, which has two outputs-color difference component signals $C_R$ and $C_B$. The output signals $C_R$ and $C_B$ are coupled to a dual pixel and line rate converter 112. The output signals $C_{HR}$ and $C_{HB}$ from the converter 112, along with the output $Y_H$ from the gamma corrector 106, are connected to the corresponding inputs of an adder 213.

The embodiment according to FIG. 2 works in the same way as described in FIG. 1. Light received from the scene being imaged is focused by the camera lens 101, through the beam splitter 102 onto the front surfaces of the imager 104. Half of the focused light is reflected from the beam splitter 102 toward color imager 201, which receives a left-right reversed image. Both imagers 201 and 104 are scanned at 30 frames per second. 30 frames per second progressive scanning should not be considered as limitation. Other frame rates, as well as interlaced scanning can be used.

The imager 104 creates a high frequency luminance signal, which carries complete information about the scene gray level pattern. Converter 105 digitizes the output signal from imager 104, and the digital data stream is gamma corrected using gamma corrector 106. In this embodiment the converter 105 is a 12-bit A/D converter, the corrector 106 compresses the data to 10 bits, and the high-luminance $Y_H$ has a resolution of $M_V=1080$ vertical lines and $M_H=1920$ horizontal pixels per line.

The color imager 201 creates a set of three signals, providing complete information about green, red and blue contents of the scene. Since the imager 201 receives a mirror image of the scene (left-right reversal), the imager 201 is scanned in reversed horizontal order from right to left, i.e. for each horizontal line the last pixel is clocked out first, and the first pixel is clocked last. Converter 107 digitizes the output signal from imager 103, and the digital data stream is further gamma corrected using gamma corrector 108. In this embodiment the converter 107 is a 12-bit A/D converter, and the corrector 108 compresses the data to 10 bits. The gamma-corrected data stream from 108 is converted in encoder 211 to a set of two color difference component signals $C_R$ and $C_B$ each with resolution 480 horizontal pixels per line, and 540 vertical lines.

The converter 112 processes only the color difference signals $C_R$ and $C_B$. During the first step, converter 112 creates one additional pixel between every two existing adjacent pixels, based on the average signal level of said adjacent pixels, and thus doubling the number of pixels in horizontal direction. This process is repeated one more time where, based on the same averaging scheme, one additional pixel is created in horizontal direction between every two already interpolated pixels. This results in quadrupling the number of horizontal pixels. During the second step one additional line is created between every two existing adjacent lines in vertical direction, based on the average signal level of said adjacent lines. In this way every high-resolution luminance pixel from the mono imager 104 will have two corresponding color difference pixels from imager 201. The interpolated color signals $C_{HR}$ and $C_{HB}$ and the luminance signal $Y_H$ are supplied to the adder 213, where they are temporally aligned, if required, using an appropriate delay line, compressed if necessary, and formatted into a standard 20 bits wide 1.5 Giga bits per second data rate. Thus, the adder 213 outputs a serial data stream representing the high-resolution image. This composite data stream is now compatible with the existing data recording and editing equipment, and in the same time contains complete image resolution and motion information. Additional information such as date, time, camera location, etc. can be added to the data stream if needed.

Accordingly, the reader will see that the present invention provides novel apparatus and method for high resolution image capture that can operate at the newly developed high definition imaging television and motion picture standards. This novel apparatus does not involve high-pass filtering and frame rate interpolation in its work. The principles of the invention have been described with reference to the present embodiments. Obviously, many modifications and variations could occur to someone skilled in the art upon reading and understanding the preceding detailed descriptions. It is intended that the invention be construed as including all such modifications and alterations insofar as they come within the scope of the appended claims or equivalents thereof.

What is claimed is:

1. A video apparatus for generating a signal representative of a scene, comprising:

an image capturing means for deriving a luminance signal with bandwidth greater than 4.2 MHz, said luminance being representative of said scene at a first frame rate, said luminance signal having a first resolution;

an image capturing means for deriving at least two color component signals, each having bandwidth greater than 0.7 MHz, said color component signals being representative of said scene at a second frame rate and having a second resolution;

a signal processing apparatus for generating, from said color component signals having said second resolution, at least two converted color component signals having said first resolution, said converted color component signals having said first frame rate;

a signal combining apparatus for combining said luminance signal and said converted color component signals, to provide a combined video signal representative of said scene at said first frame rate and having said first resolution.

2. The video apparatus of claim 1, wherein said signal processing apparatus comprises at least one pixel interpolation unit for creating at least one additional pixel between every two adjacent pixels in horizontal direction, said additional pixel having a value representative of the average signal level of said adjacent pixels, said pixel interpolation unit supplied with said color component signals and generating converted color component signals each having horizontal resolution higher than the horizontal resolution of said color component signals.

3. The video apparatus of claim 1, wherein said signal processing apparatus comprises at least one line interpolation unit for creating at least one additional line between every two adjacent lines in vertical direction, said additional line having a value representative of the average signal level of said adjacent lines, said line interpolation unit supplied with said color component signals and generating converted color component signals each having line rate higher than the line rate of said color component signal.

4. The video apparatus of claim 1, wherein said signal combining apparatus comprises at least one parallel to serial converter for converting said combined video signal from serial to parallel data format.

5. The video apparatus of claim 4, wherein said signal combining apparatus comprises at least one 1.5 Giga bits per second serial data transmitter.

6. The video apparatus of claim 1, wherein said first frame rate is equal to said second frame rate.

7. The video apparatus of claim 1, wherein said second frame rate is higher to said first frame rate.

8. A video camera for generating a signal representative of a scene, comprising:

an image capturing means for deriving a high resolution luminance signal with bandwidth greater than 4.2 MHz, said high resolution luminance being representative of said scene at a first frame rate and having a first resolution;

an image capturing means for deriving at least two color component signals and one low resolution luminance signal, each having bandwidth greater than 0.7 MHz, said color component signals and said luminance signal being representative of said scene at second frame rate higher than said first frame rate, and having a second resolution;

a signal processing apparatus for generating from said color component signals having said second resolution and said second frame rate, at least two converted color component signals having said first resolution and said first frame rate;

a motion detection apparatus for generating from said low resolution luminance signal at least one motion signal representing the difference between two consecutive frames captured at said second frame rate;

a signal combining apparatus for combining said luminance signal, said converted color component signals and said motion signals to provide a combined video signal representative of said scene, said combined video signal having said first resolution.

9. The video camera of claim 8, wherein said signal processing apparatus comprises at least one pixel interpolation unit for creating at least one additional pixel between every two adjacent pixels in horizontal direction, said additional pixel having a value representative of the average signal level of said adjacent pixels, said pixel interpolation unit supplied with said color component signals and generating converted color component signals each having horizontal resolution higher than the horizontal resolution of said color component signals.

10. The video camera of claim 8, wherein said signal processing apparatus comprises at least one line interpolation unit for creating at least one additional line between every two adjacent lines in vertical direction, said additional line having a value representative of the average signal level of said adjacent lines, said line interpolation unit supplied with said color component signals and generating converted color component signals each having line rate higher than the line rate of said color component signal.

11. The video camera of claim 8, wherein said signal combining apparatus comprises at least one parallel to serial converter for converting said combined video signal from serial to parallel data format.

12. The video camera of claim 11, wherein said signal combining apparatus comprises at least one 1.5 Giga bits per second serial data transmitter.

13. The video camera of claim 8, wherein said second frame rate is an integer multiple of said first frame rate.

14. A method for generating a video signal representative of a scene, comprising the steps of:

deriving a luminance signal representative of said scene at a first frame rate, said luminance signal having a first resolution;

deriving at least two color component signals representative of said scene at a second frame rate, said color component signals having a second resolution;

generating, from said color component signals having said second resolution, a converted color component signal having said first resolution, said converted color component signal having said second frame rate;

combining said luminance signal, and said converted color component signals to provide a video signal representative of said scene having said first resolution.

15. The method of claim 14, wherein said step of deriving said converted color component signal includes deriving at least one color difference signal and wherein said step of deriving converted color component signal comprises generating at least one color difference signal at a horizontal resolution higher than the horizontal resolution of said color component signal.

16. The method of claim 14, wherein said step of deriving said converted color component signal includes deriving at least one color difference signal and wherein said step of deriving the converted color component signal comprises generating at least one color difference signal at a line rate higher than the line rate of said color component signal.

17. The method of claim 14, wherein said step of combining said luminance signal, and said converted color component signals includes at least one parallel to serial conversion for converting said combined video signal from serial to parallel data format.

18. The method of claim 14, wherein said step of deriving said color component signals includes an additional step of generating at least one motion signal representative of the difference between two consecutive frames captured at said second frame rate.

* * * * *